United States Patent
Pan et al.

(10) Patent No.: US 11,940,587 B2
(45) Date of Patent: Mar. 26, 2024

(54) ACCURATE AND COST-EFFECTIVE INVERSION-BASED AUTO CALIBRATION METHODS FOR RESISTIVITY LOGGING TOOLS

(71) Applicant: Halliburton Energy Services, Inc., Houston, TX (US)

(72) Inventors: Li Pan, Singapore (SG); Yi Jing Fan, Singapore (SG); Hsu-Hsiang Wu, Sugarland, TX (US); Jin Ma, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 12 days.

(21) Appl. No.: 17/409,518

(22) Filed: Aug. 23, 2021

(65) Prior Publication Data
US 2023/0057184 A1    Feb. 23, 2023

(51) Int. Cl.
  *G01V 3/28* (2006.01)
  *G01V 1/50* (2006.01)
  *G01V 13/00* (2006.01)

(52) U.S. Cl.
  CPC .......... *G01V 3/28* (2013.01); *G01V 1/50* (2013.01); *G01V 13/00* (2013.01)

(58) Field of Classification Search
None
See application file for complete search history.

(56) References Cited

U.S. PATENT DOCUMENTS

| | | | |
|---|---|---|---|
| 10,444,404 B2 | 10/2019 | Donderici | |
| 2010/0082255 A1 | 4/2010 | Davydycheva et al. | |
| 2015/0241596 A1* | 8/2015 | Donderici | G01V 13/00 324/338 |
| 2017/0269255 A1 | 9/2017 | Wilson et al. | |
| 2018/0106764 A1* | 4/2018 | Fouda | G01V 3/28 |

(Continued)

FOREIGN PATENT DOCUMENTS

| | | |
|---|---|---|
| CN | 110513105 A | 11/2019 |
| EP | 3578754 A1 | 12/2019 |

(Continued)

OTHER PUBLICATIONS

International Search Report and Written Opinion for Application No. PCT/US2021/048195, dated May 13, 2022.

*Primary Examiner* — Douglas X Rodriguez

(74) *Attorney, Agent, or Firm* — Benjamin Ford; C. Turmey Law Group PLLC

(57) ABSTRACT

Systems and methods of the present disclosure relate to calibration of resistivity logging tool. A method to calibrate a resistivity logging tool comprises disposing the resistivity logging tool into a formation; acquiring a signal at each logging point with the resistivity logging tool; assuming a formation model for a first set of continuous logging points in the formation; inverting all of the signals for unknown model parameters of the formation model, wherein the formation model is the same for all of the continuous logging points in the first set; assigning at least one calibration coefficient to each type of signal, wherein the calibration coefficients are the same for the first set; and building an unknown vector that includes the unknown model parameters and the calibration coefficients, to calibrate the resistivity logging tool.

20 Claims, 7 Drawing Sheets

(56) References Cited

U.S. PATENT DOCUMENTS

2019/0086320 A1* 3/2019 Guner ................ G01V 3/30
2019/0369288 A1* 12/2019 Abellan ............... E21B 49/08
2021/0054731 A1 2/2021 Fouda et al.

FOREIGN PATENT DOCUMENTS

WO         2017066003 A1    4/2017
WO         2018208280        11/2018
WO    WO-2019168698 A1 * 9/2019 ............ E21B 47/00

* cited by examiner

ACCURATE AND COST-EFFECTIVE INVERSION-BASED AUTO CALIBRATION METHODS FOR RESISTIVITY LOGGING TOOLS

BACKGROUND

For induction logging tools, calibration may be utilized to remove the effect of tool body, electronic system, and environment. The calibrated signals may be inverted for the final answer product. Unfortunately, the additional cost for calibration measurements in air or in known formations may be expensive, especially for multi-sub tools. The air-hang cost may increase due to multiple calibrations, due to upgraded hardware. Also, the air-hang calibration may not be accurate, because the calibration factor is not constant. Further, azimuth offset between transmitting and receiving subs may cause an inaccurate calibrated signal. The inaccurate calibrated signal may introduce errors in the final answer product. Although the in-situ calibration may be more accurate, it is often not feasible, because prior knowledge of a section of a known formation may not be available.

BRIEF DESCRIPTION OF THE DRAWINGS

These drawings illustrate certain aspects of some examples of the present disclosure and should not be used to limit or define the disclosure.

DETAILED DESCRIPTION

Figure 1:
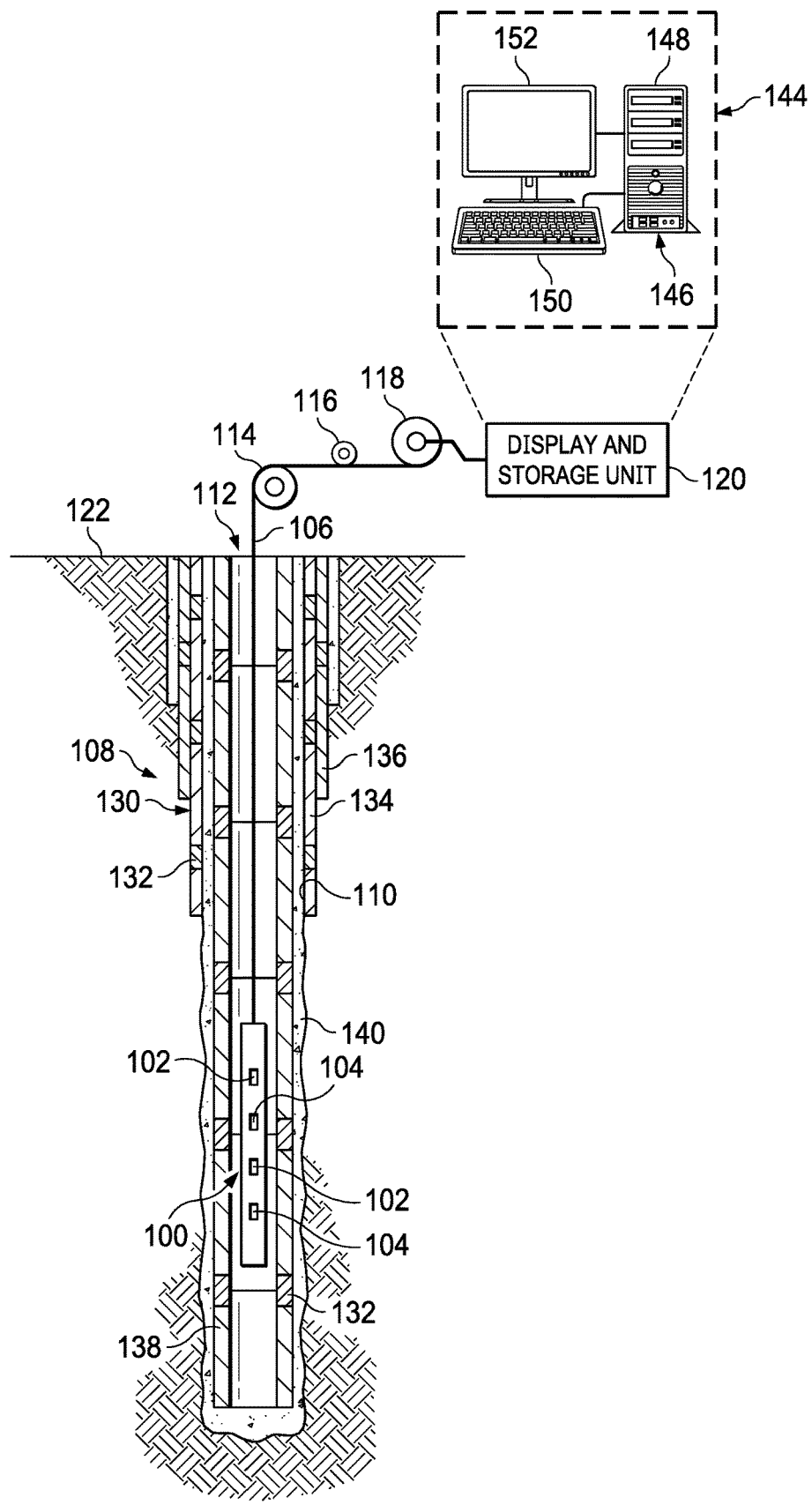
FIG. 1 illustrates a resistivity tool in a wireline configuration, in accordance with examples of the present disclosure.

The present disclosure generally relates to calibration of resistivity logging tools, and, more particularly, examples may relate to an accurate and cost-effective inversion-based auto calibration systems and methods for resistivity logging tools. In formation evaluation, formation model parameters may be evaluated by fitting simulated responses to measured responses. Conventionally, the fitting may be performed in two steps. In the first step, a calibration factor may be evaluated; and in the second step, the model parameters may be adjusted to minimize any misfit between the simulated responses and the measured responses. Typically, calibration factors are acquired first from the measured and simulated signal in some known environment, such as air (air-hang calibration) or known formation (in-situ calibration). After that this calibration coefficient is used to calibrate the measured signal during the whole field job, and then inversion is performed based on the calibrated signal. Unfortunately, there are challenges related to this conventional way of calibration.

The additional cost for calibration measurement in the air or in known formations is expensive, especially for multi-sub tools. The air-hang cost becomes even higher because of repeat calibrations, due to upgraded hardware design. The air-hang calibration is often not accurate, because the calibration factor actually varies with the formation environment, and with azimuth offset between TX (transmitting) and RX (receiving) subs. The inaccurate calibrated signal often introduces annoying errors in answer products. Although the in-situ calibration may be more accurate, it is often not feasible, because the prior knowledge of a section of known formation is rarely available. The systems and methods of the present disclosure may overcome the above-mentioned challenges by performing inversion for both the formation model parameters and the calibration factors, by (1) using the same formation model for a group of continuous (consecutive) logging points, (2) and fitting the response not only for a single logging point, but instead for a group of continuous logging points. The methodology may be validated by the following three observations: (1) the relation between the raw measured signal ($m_r$) and the perfectly calibrated signal ($m_c$) may be well modeled by a polynomial function $m_c=P(m_c)$, for example $m_c=\Sigma_{i=0}^{N}a_i m_r^i$, where $a_i$ (i=0, 1, . . . ) are the model parameters to be determined; and (2) in a logging-while-drilling (LWD) field trial, the formation environment, and therefore the polynomial function $m_c=P(m_c)$, does not vary sharply for a part of well path of several feet in drilling direction. (3) although the formation model does not vary significantly for continuous logging points, but the measured signal may exhibit a large variation because location of sensors are different in the formation for each one of the group of continuous logging points.

In certain examples, additional measurements for calibration do not need to be performed resulting in a lower cost. The calibration factor may be produced in real time with inversion software and the calibration factor may vary with the formation environment resulting in a more accurate signal. The improved calibration factor may result in an improvement for the final answer products such as for example, a curtain plot, geo-signal, and/or an azimuthal resistivity log. Additionally, techniques of the present disclosure may be implemented without any change in hardware or firmware.

FIG. 1 illustrates an operating environment for a resistivity tool 100, in accordance with examples of the present disclosure. It should be noted that while FIG. 1 generally depicts a land-based operation, those skilled in the art may recognize that the principles described herein are equally applicable to subsea operations that employ floating or sea-based platforms and rigs, without departing from the scope of the disclosure.

As illustrated, the resistivity tool 100 may include at least one transmitter 102 and at least one receiver 104. Any suitable transmitter and receiver may be employed. The transmitters 102 and the receivers 104 may be disposed along the resistivity tool 100 in any suitable configuration. The resistivity tool 100 may be operatively coupled to a conveyance 106 (e.g., wireline, slickline, coiled tubing, pipe, downhole tractor, and/or the like) which may provide mechanical suspension, as well as electrical connectivity, for the resistivity tool 100. It should be understood that the configuration of resistivity tool 100 shown on FIG. 1 is merely illustrative and other configurations of the resistivity tool 100 may be used with the present techniques.

A conveyance 106 and the resistivity tool 100 may extend within a casing string 108 to a desired depth within the wellbore 110. The conveyance 106, which may include one or more electrical conductors, may exit a wellhead 112, may pass around a pulley 114, may engage an odometer 116, and may be reeled onto a winch 118, which may be employed to raise and lower the resistivity tool 100 in the wellbore 110. Signals recorded by the resistivity tool 100 may be stored on memory and then processed by a display and storage unit 120 after recovery of the resistivity tool 100 from the wellbore 110. Alternatively, signals recorded by the resistivity tool 100 may be transmitted to the display and storage unit 120 by way of the conveyance 106. The display and storage unit 120 may process the signals, and the information contained therein may be displayed for an operator to observe and store for future processing and reference. Alternatively, the signals may be processed downhole prior to receipt by display and storage unit 120 or both downhole and at a surface 122, for example. The display and storage unit 120 may also contain an apparatus for supplying control signals and power to the resistivity tool 100. The casing string 108 may extend from the wellhead 112 at or above ground level to a selected depth within the wellbore 110. The casing string 108 may comprise a plurality of joints 130 or segments of the casing string 108, each joint 130 being connected to the adjacent segments by a collar 132. There may be any number of layers in the casing string 108. For example, the layers may include a first casing 134 and a second casing 136.

FIG. 1 also illustrates a pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. The resistivity tool 100 may be dimensioned so that it may be lowered into the wellbore 110 through the pipe string 138, thus avoiding the difficulty and expense associated with pulling pipe string 138 out of wellbore 110. In examples, cement 140 may be disposed on the outside of pipe string 138. Cement 140 may further be disposed between pipe string 138 and casing string 108. It should be noted that cement 140 may be disposed between any number of casings, for example between the first casing 134 and the second casing 136.

In logging systems utilizing the resistivity tool 100, a digital telemetry system may be employed, wherein an electrical circuit may be used to both supply power to the resistivity tool 100 and to transfer data between the display and storage unit 120 and the resistivity tool 100. A DC voltage may be provided to the resistivity tool 100 by a power supply located above ground level, and data may be coupled to the DC power conductor by a baseband current pulse system. Alternatively, the resistivity tool 100 may be powered by batteries located within the downhole tool assembly, and/or the data provided by the resistivity tool 100 may be stored within the downhole tool assembly, rather than transmitted to the surface during logging.

In certain examples, operation and function of the resistivity tool 100 may be controlled at the surface 122 by a computer 144. As illustrated, the computer 144 may be a component of the display and storage unit 120. The computer 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, the computer 144 may be a personal computer, a network storage device, or any other suitable device and may vary in size, shape, performance, functionality, and price. The computer 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. The non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. At the surface 122, the computer 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with the resistivity tool 100 and/or software executed by processing unit 146. For example, the computer 144 may enable an operator to select analysis options, view collected log data, view analysis results, and/or perform other tasks. In examples, the resistivity tool 100 and the computer 144 may be utilized to measure and process properties (e.g., signals) of a downhole environment.

Figure 2:
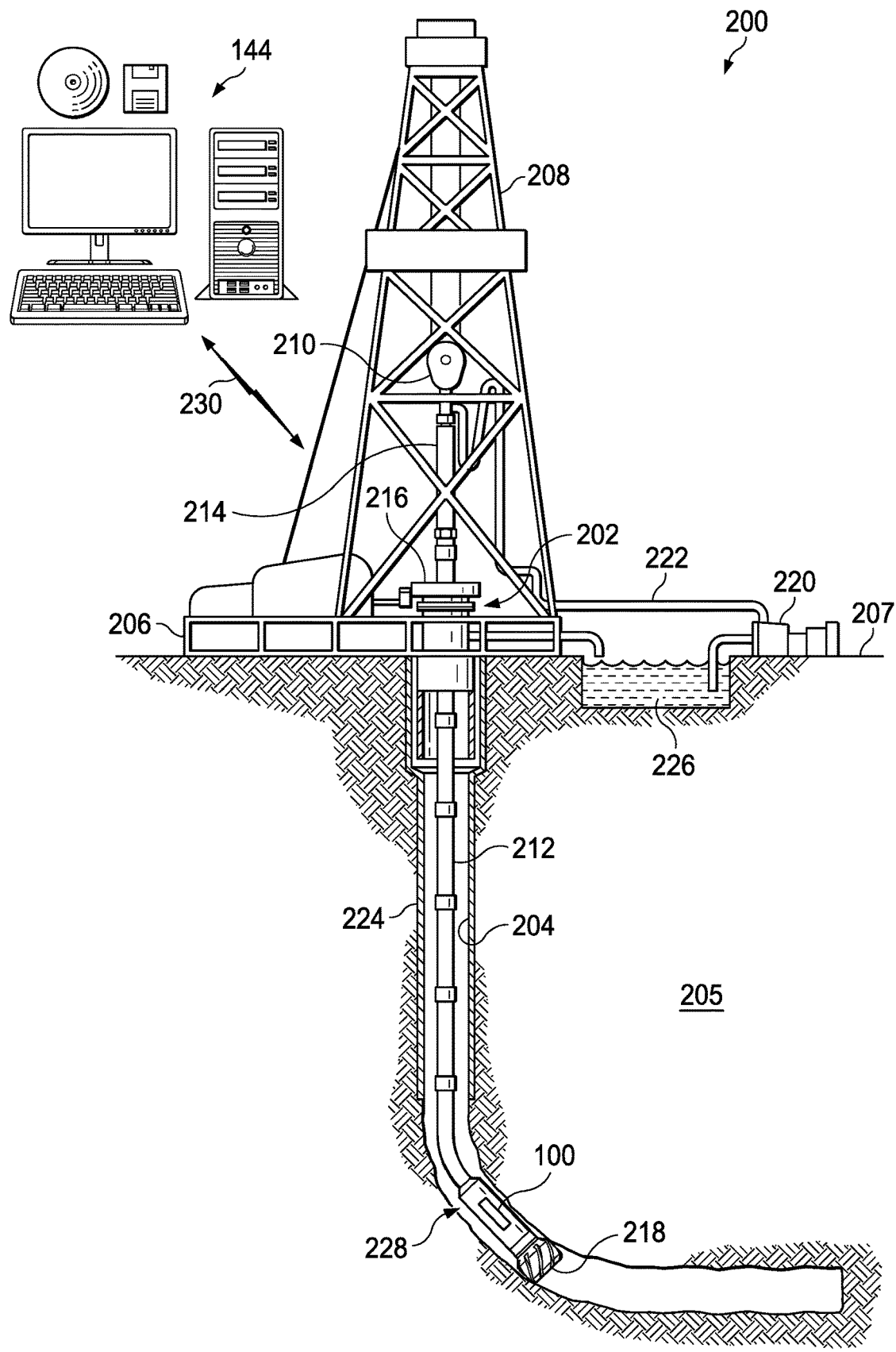
FIG. 2 illustrates a resistivity tool in a drilling configuration, in accordance with examples of the present disclosure.

FIG. 2 illustrates an example of the resistivity tool 100 included in a drilling system 200, in accordance with examples of the present disclosure. It should be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a borehole 204 may extend from a wellhead 202 into a subterranean formation 205 from a surface 207. The borehole 204 may include horizontal, vertical, slanted, curved, and other types of borehole geometries and orientations. A drilling platform 206 may support a derrick 208 having a traveling block 210 for raising and lowering a drill string 212. The drill string 212 may include, but is not limited to, drill pipe and coiled tubing, as generally known to those skilled in the art. A top drive or kelly 214 may support the drill string 212 as it may be lowered through a rotary table 216.

A drill bit 218 may be attached to the distal end of drill string 212 and may be driven either by a downhole motor and/or via rotation of drill string 212 from the surface 207. Without limitation, the drill bit 218 may include roller cone bits, PDC bits, natural diamond bits, any hole openers, reamers, coring bits, and the like. As the drill bit 218 rotates, it may create and extend borehole 204 that penetrates the subterranean formation 205. A pump 220 may circulate drilling fluid through a feed pipe 222 to the kelly 214, downhole through the interior of the drill string 212, through orifices in the drill bit 218, back to the surface 207 via an annulus 224 surrounding the drill string 212, and into a retention pit 226.

The drill string 212 may begin at wellhead 202 and may traverse borehole 204. The drill bit 218 may be attached to a distal end of the drill string 212 and may be driven, for example, either by a downhole motor and/or via rotation of the drill string 212 from the surface 207. The drill bit 218 may be a part of a bottom hole assembly 228 at a distal end of the drill string 212. The bottom hole assembly 228 may include the resistivity tool 100 via threaded connections, for example. As will be appreciated by those of ordinary skill in the art, bottom hole assembly 228 may be a measurement-while drilling (MWD) or logging-while-drilling (LWD) system.

Without limitation, the resistivity tool 100 may be connected to and/or controlled by the computer 144. Processing of information recorded may occur downhole and/or at the surface 207. Data being processed downhole may be transmitted to the surface 207 to be recorded, observed, and/or further analyzed. Additionally, the data may be stored in memory of the resistivity tool 100 while the resistivity tool 100 is disposed downhole.

In some examples, wireless communication may be used to transmit information back and forth between the computer 144 and the resistivity tool 100. The computer 144 may transmit information to the resistivity tool 100 and may receive, as well as process information recorded by the resistivity tool 100. In examples, while not illustrated, the bottom hole assembly 228 may include one or more additional components, such as an analog-to-digital converter, filter and amplifier, among others, that may be used to process the measurements of the resistivity tool 100 before they may be transmitted to the surface 207. Alternatively, raw measurements may be transmitted to the surface 207 from the resistivity tool 100.

Any suitable technique may be used for transmitting signals from the resistivity tool 100 to the surface 207, including, but not limited to, wired pipe telemetry, mud-pulse telemetry, acoustic telemetry, and electromagnetic telemetry. While not illustrated, the bottom hole assembly 228 may include a telemetry subassembly that may transmit telemetry data to the surface 207. Without limitation, an electromagnetic source in the telemetry subassembly may be operable to generate pressure pulses in the drilling fluid that propagate along the fluid stream to the surface 207. At the surface 207, pressure transducers (not shown) may convert the pressure signal into electrical signals for a digitizer (not illustrated). The digitizer may supply a digital form of the telemetry signals to the computer 144 via a communication link 230, which may be a wired or wireless link. The telemetry data may be analyzed and processed by the computer 144. During processing of information with the resistivity tool 100 and/or the computer 144 (e.g., shown on FIGS. 1 and 2), the same formation model (e.g., a stratified layer model, or 2D model or 3D model) may be assumed for M continuous logging points. A signal at each logging point may be acquired with a resistivity tool and all of the acquired signals for the M continuous logging points for P unknown parameters of the formation model may be inverted. It may be assumed that there are N types of signals in total, such that for M loggings points, there are N*M signals in total. A number of K calibration coefficients ($a_0, a_1, \ldots, a_{K-1}$) may be assigned to each type of signal, such as for example, K=1 or 2. Types of signals may include but not limited to the phase, amplitude, real part, imaginary part of measured electromagnetic signal. The calibration factor may be the same for any of the M logging points. For example, a calibration factor of 3 is assigned for first type of signal, then the first type of signal at any of the M logging points may be corrected by 3. Each calibration factor may be regarded as an unknown variable, so there are additional N unknown variables.

During an inversion, KN+P unknown variables (KN calibration factors and P unknown model parameters) may be evaluated by comparing N*M measured and simulated signals. Because the number of signals may be much larger than the number of unknowns, the non-uniqueness of inversion may be reduced, resulting in improved inversion results. The inversion-based auto calibration technique may repeat for the next M continuous logging points. N may include a number of signal types; and a number of calibration factors. M includes a number of continuous logging points for the inversion. P is the number of unknown model parameters. More measurements may reduce the non-uniqueness of an inversion problem and improve the accuracy of inversion results.

Figure 3:
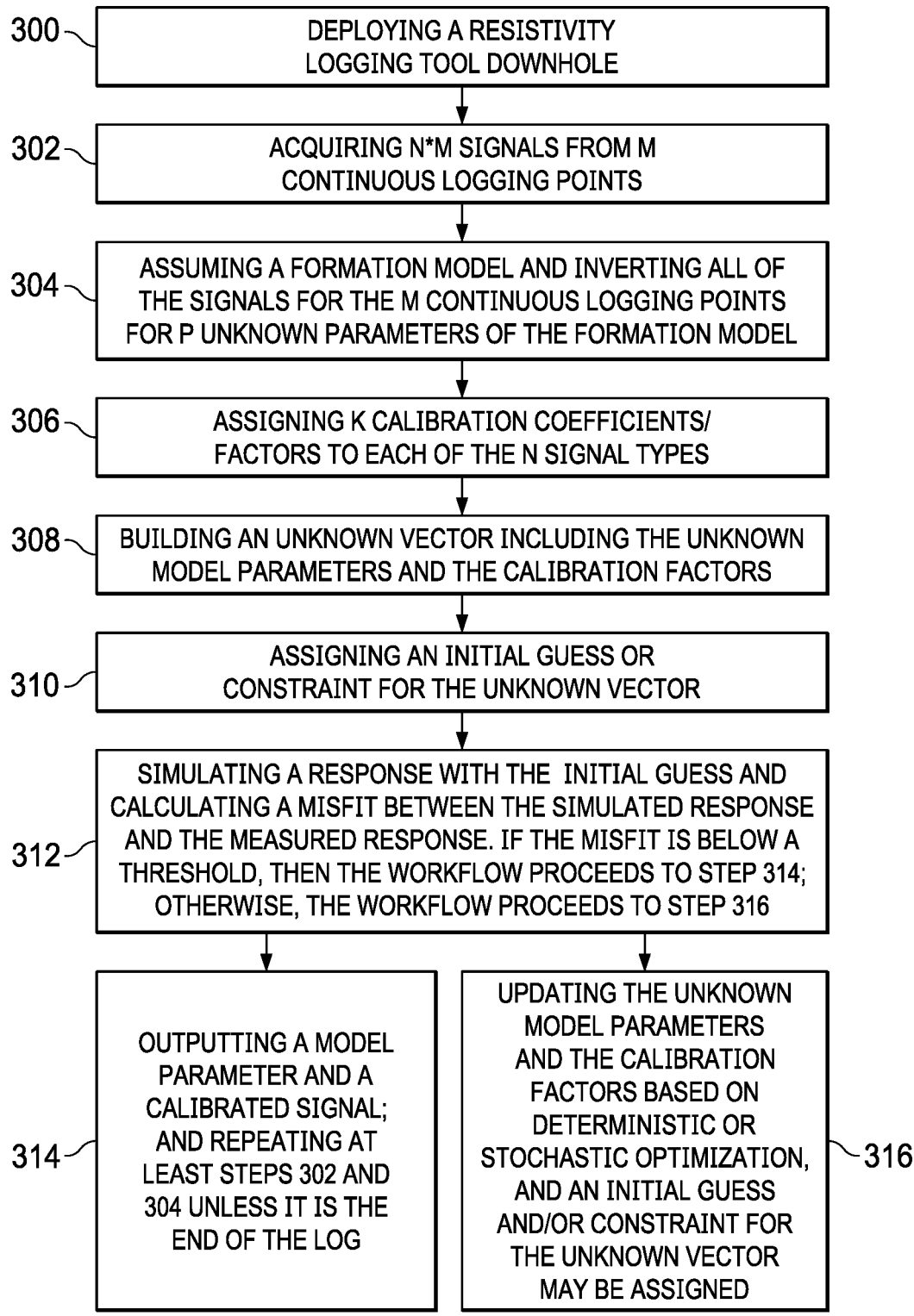
FIG. 3 illustrates a flow chart for an inversion-based auto calibration technique for resistivity tools, in accordance with examples of the present disclosure.

FIG. 3 illustrates a flow chart for an inversion-based auto calibration technique for resistivity tools, in accordance with examples of the present disclosure. At step 300, a resistivity logging tool (e.g., resistivity tool 100 shown on FIGS. 1 and 2) may be deployed in a downhole environment. At step 302, the resistivity logging tool may acquire N*M signals from M continuous logging points. At step 304, a formation model may be assumed for processing the acquired signals. The acquired signal may be inputted into the formation model. All of the signals for the M continuous logging points may be inverted for P unknown parameters of the formation model via minimizing a cost function which consists of the difference between measured signal and simulated signal and regularization term, an example is Equation 1:

$$f(\bar{a},\bar{x})=\|\bar{m}_c-\bar{s}\|_2^2+\alpha R(\bar{x},\bar{a})\qquad\text{Eq. (1)}$$

where $\bar{m}_c$ is a vector of all calibrated measured signals, $\bar{s}$ is a vector of all simulated signals, $\alpha$ is regularization coefficient, $R(\bar{x})$ is regularization term, $\bar{a}$ is a vector of KN calibration coefficients, $\bar{x}$ is a vector of model parameters, $\|*\|_2$ is L2 norm.

Suitable formation models include a stratified layer model, a 2D model or a 3D model. At step 306, K calibration factor variable may be assigned for each of the N signal types, there are KN calibration factors in total. At step 308, an unknown vector may be built (e.g., via a computer 144 shown on FIG. 1). The unknown vector may include unknown model parameters and unknown calibration factors.

At step 310, an initial guess or constraint may be assigned for the unknown vector. At step 312, a simulation may be performed with the initial guess via software/simulator to provide a simulated response for the resistivity tool. A misfit may be calculated between the simulated response and the measured response. If the misfit is below a threshold, then the workflow proceeds to step 314. Otherwise, the workflow proceeds to step 318. At step 316, a model parameter and the calibrated signal may be output and at least steps 302 and 304 may be repeated, unless it is the end of the log. At step 318, the unknown variables may be updated based on deterministic or stochastic optimization, and repeating step 310.

Figure 4:
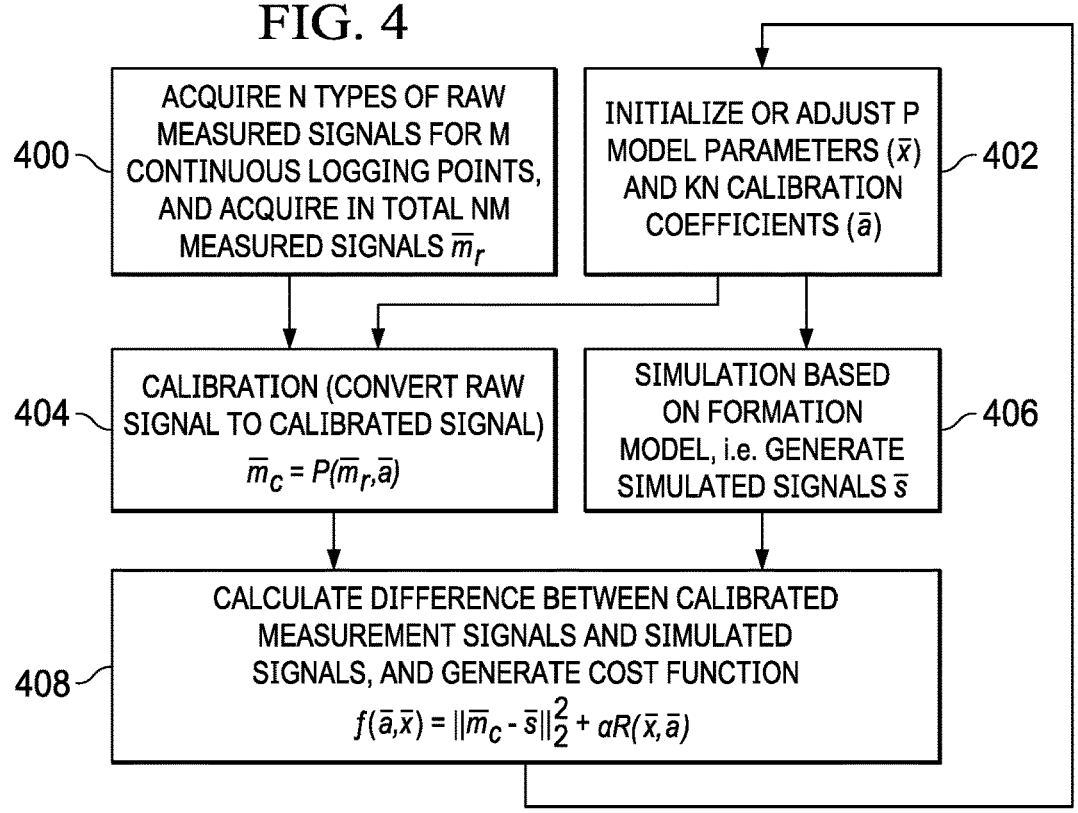
FIG. 4 illustrates an exemplary flow chart generating a cost function in accordance with examples of the present disclosure.

FIG. 4 illustrates an exemplary flow chart generating a cost function, in accordance with examples of the present disclosure. At step 400, NM raw measured signals $m_r$ may be acquired. For example, N types of raw measured signals for M continuous logging points may be acquired resulting in a total of NM measured signals $\overline{m}_r$. At step 402, P model parameters ($\overline{x}$) and KN calibration coefficients may be initialized. At step 404, calibration may occur (e.g., convert raw signal to calibrated signal $\overline{m}_c$) by Equation 2:

$$\overline{m}_c = P(\overline{m}_r, \overline{a}) \qquad \text{Eq. (2)}$$

At step 406, a simulation based on a formation model may occur to generate simulated signals $\overline{s}$. At step 408, a cost function may be generated by calculating a difference between calibrated measurement signals as shown by Equation 1. In some examples, steps 402 to 408 may be repeated.

Figure 5:
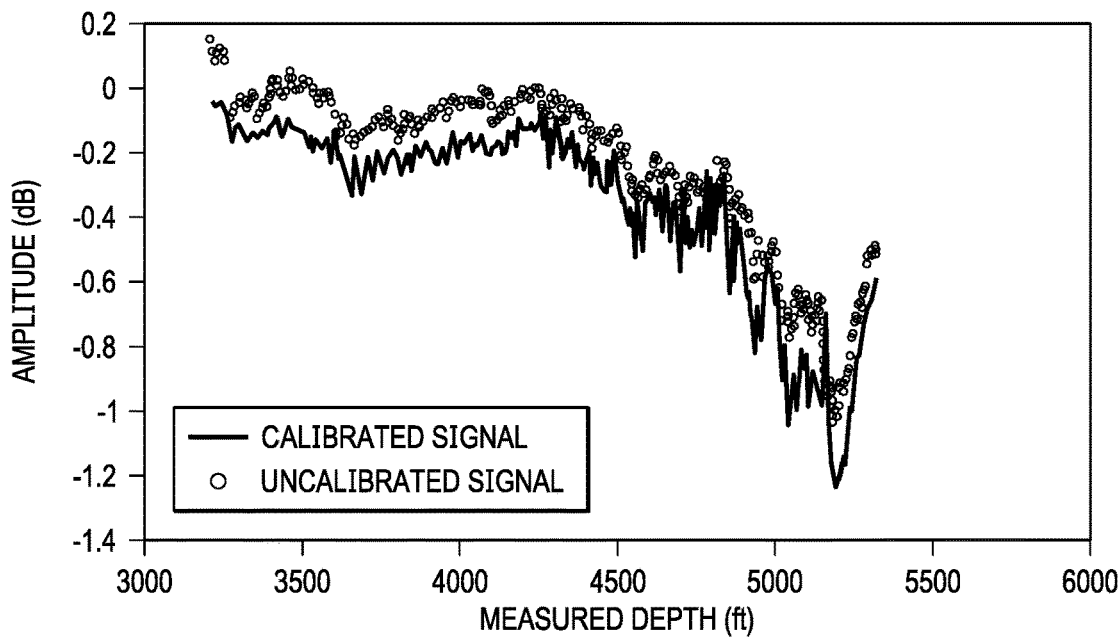
FIG. 5 illustrates a graph depicting the difference between a raw measured resistivity signal and a calibrated resistivity signal, in accordance with examples of the present disclosure.

FIG. 5 illustrates a graph depicting the difference between a raw measured electromagnetic signal and a calibrated electromagnetic signal, in accordance with examples of the present disclosure. As illustrated, the perfectly calibrated signal may be a linear shift in attenuation and phase from the raw signal. Therefore, a polynomial model with 2 parameters is enough to convert the raw signal to calibrated signal.

Figure 6:
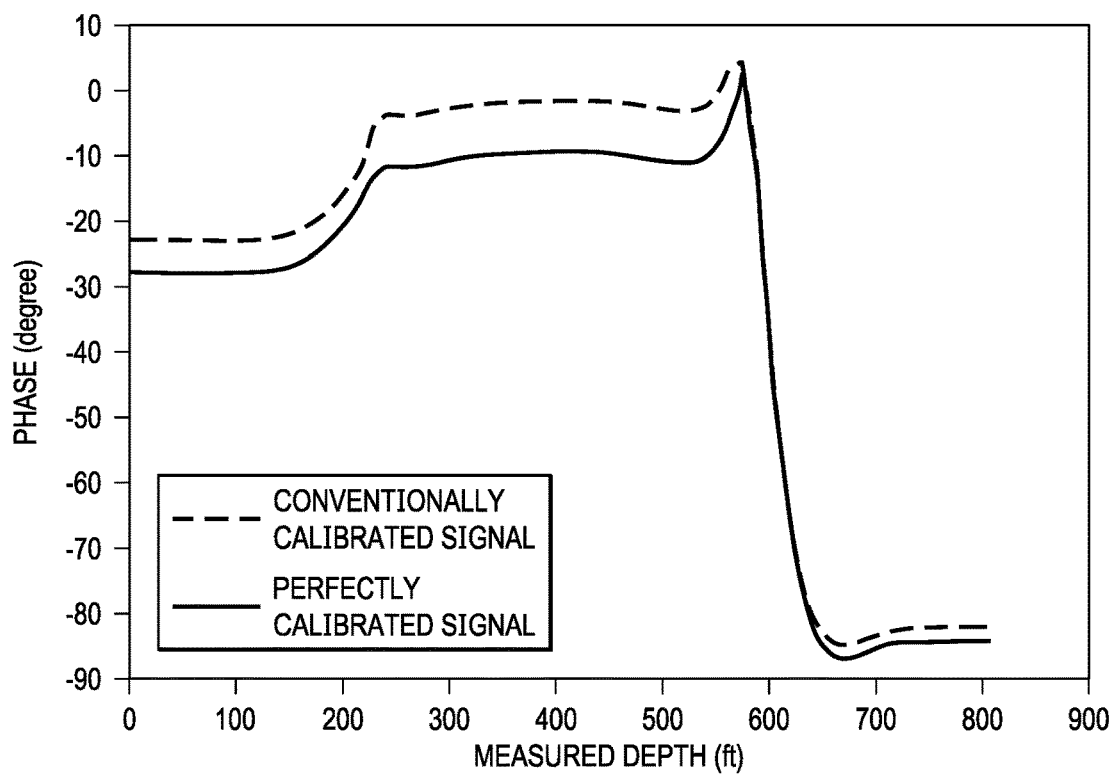
FIG. 6 illustrate differences between various auto-calibrated signals and conventionally calibrated signals, in accordance with examples of the present disclosure.

FIG. 6 illustrates differences between various auto-calibrated signals and conventionally calibrated signals, in accordance with examples of the present disclosure. As shown, the conventional calibration method (e.g., air-hang calibration or in-situ calibration) is not accurate compared to the perfectly calibrated signal.

Figure 7:
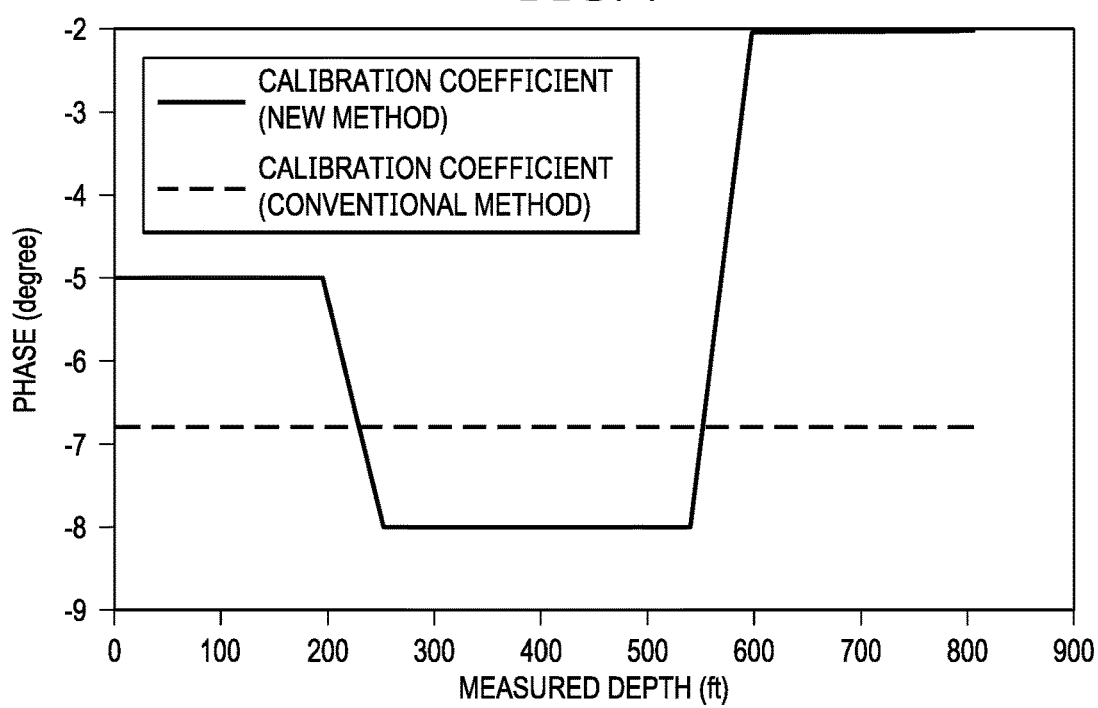
FIG. 7 illustrates a calibration factor, in accordance with examples of the present disclosure.

FIG. 7 illustrates a calibration factor/coefficient, in accordance with examples of the present disclosure. The calibration factor from the auto-calibration technique as described herein may vary with the formation, while the conventional calibration does not. For the conventional methods, the calibration factor is fixed for the whole field test and does not vary with formation environment.

Figure 8A:
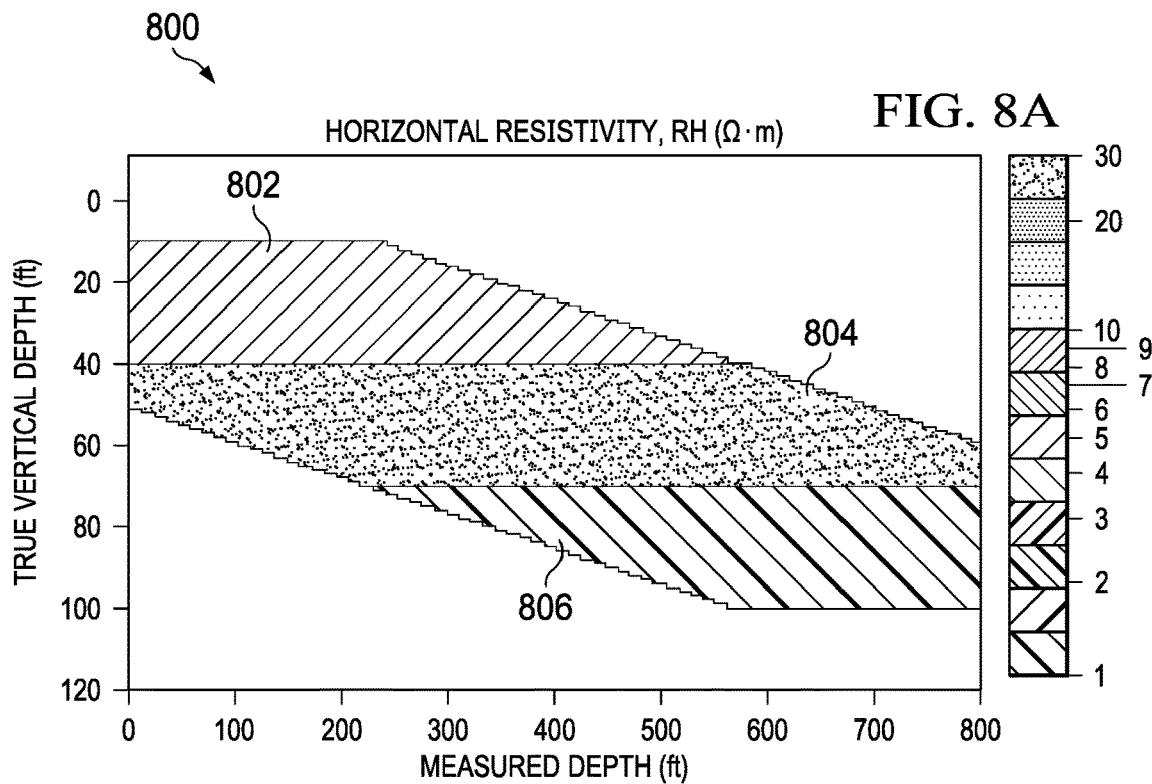
FIGS. 8A-8C illustrate 3-layer formation models, in accordance with examples of the present disclosure.

FIG. 8A illustrates an exact 3-layer formation model 800, in accordance with examples of the present disclosure. In some examples, the 3-layer formation model 800 may include a curtain plot. A first layer 802 has a resistivity of 5 ohm-meters. A second layer 804 has a resistivity of 20 ohm-meters. A third layer 806 has a resistivity of 1 ohm-meter. The layers may extend horizontally along a measured depth of a wellbore.

Figure 8B:
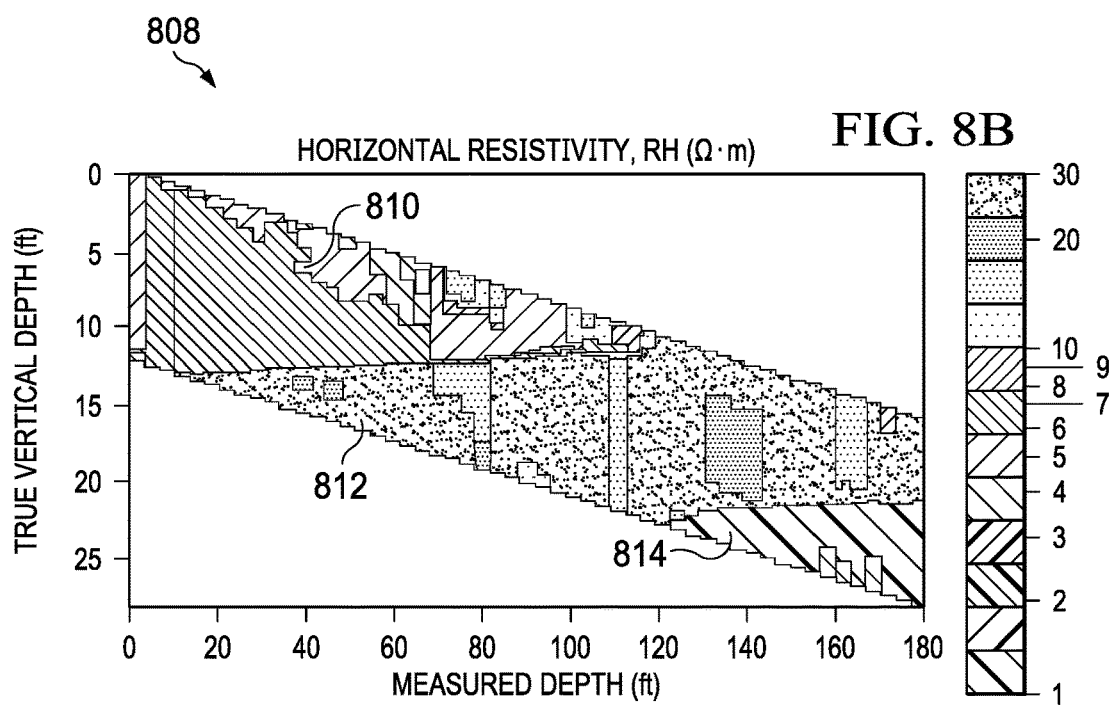

FIG. 8B illustrates a 3-layer formation model 808 based on conventional calibration, in accordance with examples of the present disclosure. The formation model 808 includes a first layer 710, a second layer 812, and a third layer 814. In some examples, the 3-layer formation model 708 may include a curtain plot. In comparison to the exact model 800 of FIG. 8A, resistivities of the first layer 810, the second layer 812, and the third layer 814 do not match the exact resistivities and thus the conventional calibration is not accurate.

Figure 8C:
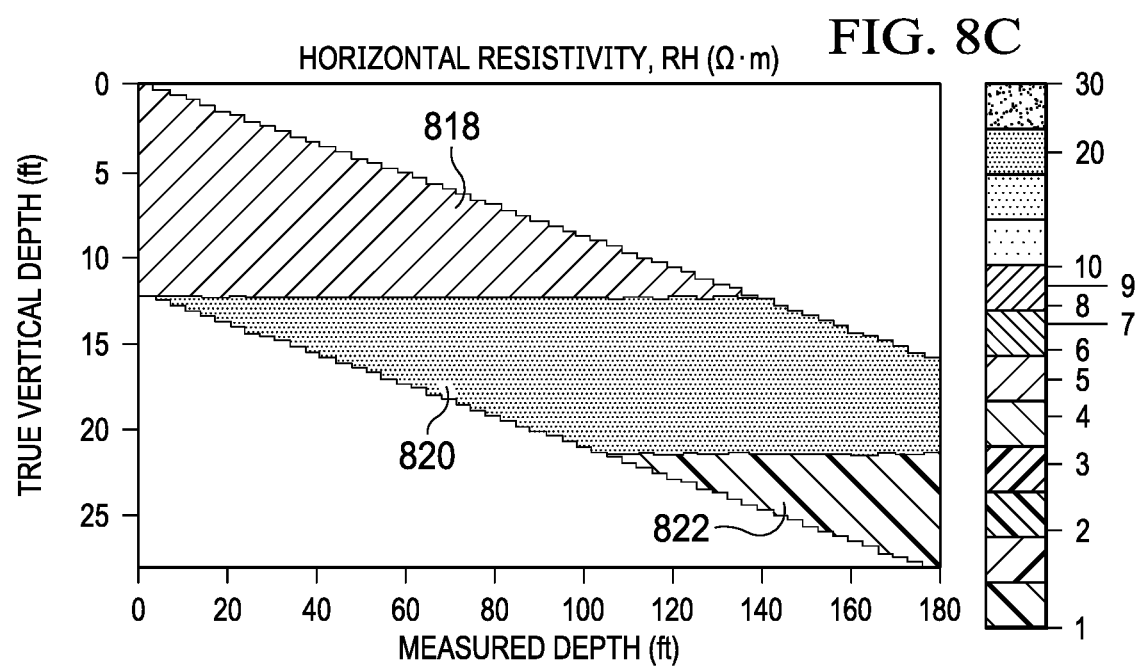

FIG. 8C illustrates a 3-layer formation model 816 based on inversion results with auto-calibrated signals, in accordance with examples of the present disclosure. The formation model 816 includes a first layer 818, a second layer 820, and a third layer 822. In some examples, the 3-layer formation model 816 may include a curtain plot. In comparison to the exact model 800 of FIG. 8A, resistivities of the first layer 818, the second layer 820, and the third layer 822 match the resistivities and thus inversion results with auto-calibrated signals are accurate.

Accordingly, the systems and methods of the present disclosure allow for a more accurate and cost-effective calibration of resistivity tools. The systems and methods may include any of the various features disclosed herein, including one or more of the following statements.

Statement 1. A method to calibrate a resistivity logging tool comprises disposing the resistivity logging tool into a formation; acquiring a signal at each logging point with the resistivity logging tool; assuming a formation model for a first set of continuous logging points in the formation; inverting all of the signals for unknown model parameters of the formation model; assigning at least one calibration coefficient to each type of signal; and building an unknown vector that includes the unknown model parameters and the calibration coefficients, to calibrate the resistivity logging tool.

Statement 2. The method of the statement 1, further comprising assigning an initial guess or constraint for the unknown vector.

Statement 3. The method of the statement 1 or the statement 2, further comprising simulating a response with the initial guess or the constraint.

Statement 4. The method of any one of the statements 1-3, further comprising calculating a misfit between a simulated response and a measured response.

Statement 5. The method of any one of the statements 1-4, further comprising outputting a calibrated signal, wherein the misfit is below a threshold.

Statement 6. The method of any one of the statements 1-5, further comprising updating the unknown model parameters and the calibration coefficient based on deterministic or indeterministic optimization, wherein the misfit exceeds a threshold.

Statement 7. The method of any one of the statements 1-6, further comprising assigning an initial guess or constraint for the unknown vector.

Statement 8. The method of any one of the statements 1-7, further comprising varying the calibration coefficient with the formation.

Statement 9. The method of any one of the statements 1-8, further comprising producing the calibration coefficient in real time.

Statement 10. The method of any one of the statements 1-9, wherein assuming the same formation model comprises assuming a stratified layer model, a 2-dimensional model, or a 3-dimensional model.

Statement 11. The method of any one of the statements 1-10, further comprising acquiring signals for a second set of continuous logging points with the resistivity logging tool.

Statement 12. The method of any one of the statements 1-11, further comprising assuming a second formation model for the second set of continuous logging points in the formation.

Statement 13. A system for calibrating a resistivity logging tool, comprising: the resistivity logging tool operable to acquire signals at continuous logging points in a formation; and a computer operable to: receive a signal at each logging point via the resistivity logging tool; input the signals into a formation model; invert all of the signals for unknown model parameters of the formation model; assign at least one calibration coefficient to each type of signal; and build an unknown vector that includes the unknown model parameters and the calibration coefficients, to calibrate the resistivity logging tool.

Statement 14. The system of the statement 13, wherein the computer is further operable to assign an initial guess or constraint for the unknown vector.

Statement 15. The system of the statement 13 or the statement 14, further comprising simulating a response with the initial guess or the constraint.

Statement 16. The system of any one of the statements 13-15, wherein the computer is further operable to calculate a misfit between a simulated response and a measured response.

Statement 17. The system of any one of the statements 13-16, wherein the computer is further operable to output a calibrated signal, wherein the misfit is below a threshold.

Statement 18. The system of any one of the statements 13-17, wherein the computer is further operable to update the unknown model parameters and the calibration coefficients based on deterministic or indeterministic optimization, wherein the misfit exceeds a threshold.

Statement 19. The system of any one of the statements 13-18, wherein the calibration coefficients assigned to each type of signals are the same for the continuous logging points.

Statement 20. The system of any one of the statements 13-19, wherein the formation model is the same for all of the continuous logging points.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method to calibrate a resistivity logging tool, comprising:
   disposing the resistivity logging tool into a formation, wherein the resistivity logging tool comprises a transmitter and a receiver;
   transmitting a signal with the transmitter;
   acquiring a return signal at each logging point with the receiver;
   assuming a formation model for a first set of continuous logging points in the formation;
   assigning at least one calibration coefficient to each type of signal;
   building an unknown vector that includes unknown model parameters and the calibration coefficients; and
   inverting the unknown vector that includes the calibration coefficients and the unknown model parameters of the formation model, to calibrate the resistivity logging tool.

2. The method of claim 1, further comprising assigning an initial guess or constraint for the unknown vector.

3. The method of claim 2, further comprising simulating a response with the initial guess or the constraint.

4. The method of claim 3, further comprising calculating a misfit between a simulated response and a measured response.

5. The method of claim 4, further comprising outputting a model parameter and a calibrated signal, wherein the misfit is below a threshold.

6. The method of claim 4, further comprising updating the unknown model parameters and the calibration coefficient based on deterministic or indeterministic optimization, wherein the misfit exceeds a threshold.

7. The method of claim 6, further comprising assigning an initial guess or constraint for the unknown vector.

8. The method of claim 1, wherein the calibration coefficients are not constant for a complete field test.

9. The method of claim 1, further comprising producing the calibration coefficient in real time.

10. The method of claim 1, wherein assuming the same formation model comprises assuming a stratified layer model, a 2-dimensional model, or a 3-dimensional model.

11. The method of claim 1, further comprising acquiring signals for a second set of continuous logging points with the resistivity logging tool.

12. The method of claim 1, further comprising assuming a second formation model for the second set of continuous logging points in the formation.

13. A system for calibrating a resistivity logging tool, comprising:
   the resistivity logging tool operable to acquire signals at continuous logging points in a formation, wherein the resistivity logging tool comprises a transmitter configured to transmit a signal and a receiver configured to receive a return signal; and
   a computer operable to:
     receive a signal from the receiver at each logging point via the resistivity logging tool;
     input the signals into a formation model;

assign at least one calibration coefficient to each type of signal;

build an unknown vector that includes unknown model parameters and the calibration coefficients; and invert the unknown vector that includes the calibration coefficients and the unknown model parameters of the formation model, to calibrate the resistivity logging tool.

14. The system of claim 13, wherein the computer is further operable to assign an initial guess or constraint for the unknown vector.

15. The system of claim 14, further comprising simulating a response with the initial guess or the constraint.

16. The system of claim 15, wherein the computer is further operable to calculate a misfit between a simulated response and a measured response.

17. The system of claim 16, wherein the computer is further operable to output a calibrated signal, wherein the misfit is below a threshold.

18. The system of claim 16, wherein the computer is further operable to update the unknown model parameters and the calibration coefficients based on deterministic or indeterministic optimization, wherein the misfit exceeds a threshold.

19. The system of claim 18, wherein the calibration coefficients assigned to each type of signals are the same for the continuous logging points.

20. The system of claim 19, wherein the formation model is the same for all of the continuous logging points.

\* \* \* \* \*